United States Patent [19]
McKellip et al.

[11] Patent Number: 5,891,501
[45] Date of Patent: Apr. 6, 1999

[54] METHOD FOR EXTRACTION OF ESSENTIAL OILS FROM PLANT MATERIAL

[76] Inventors: Lewis L. McKellip, 18120 Dean La., Nampa, Id. 83687; Peter Bing, 9700 W. Pico Blvd., Los Angeles, Calif. 90035; Barry M. Trost, 24510 Amigos Ct., Los Altos Hills, Calif. 94024

[21] Appl. No.: 977,870

[22] Filed: Nov. 25, 1997

[51] Int. Cl.$^6$ .................................................. A23L 1/28
[52] U.S. Cl. ........................................ 426/489; 426/651
[58] Field of Search .................................. 426/489, 431, 426/655, 638, 651

[56] References Cited

U.S. PATENT DOCUMENTS

| | | | |
|---|---|---|---|
| 3,870,053 | 3/1975 | Heitkamp et al. | 131/121 |
| 4,495,033 | 1/1985 | Rathbun et al. | 202/118 |
| 4,935,104 | 6/1990 | Coutiere | 203/85 |
| 5,002,784 | 3/1991 | Pare et al. | 426/241 |
| 5,024,820 | 6/1991 | Coutiere | 422/261 |
| 5,372,680 | 12/1994 | Bezdolny et al. | 202/83 |
| 5,582,694 | 12/1996 | McClelland | 203/96 |

OTHER PUBLICATIONS

G. Hawley. The Condensed Chemical Dictionary. 10th Ed. pp. 986 and 1095, 1981.

*Primary Examiner*—Anthony J. Weier
*Attorney, Agent, or Firm*—Margaret M. Dunbar

[57] ABSTRACT

A method for extracting mint oil from mint plants, the method includes applying a surfactant on the plant material and subjecting the plant material to steam distillation.

3 Claims, 3 Drawing Sheets

METHOD FOR EXTRACTION OF ESSENTIAL OILS FROM PLANT MATERIAL

FIELD OF THE INVENTION

The present invention relates to the extraction of essential oils from plants. More particularly, the present invention relates to a process to improve the yield of essential oil extracted from mint plants by steam- or hydro-distillation.

BACKGROUND OF THE INVENTION

Essential oils are flavor and fragrance materials harvested from plant sources. These materials are obtained from approximately one-third of the known plant families, most often by physical means. Peppermint and spearmint are two such essential oils of significant commercial value. Peppermint and spearmint oils typically are generically referred to as mint oil.

The historical use and value of the mint plant for fragrance and medicinal purposes can be traced back to as early as biblical times. The distillation of mint oil from the plants for use in medicines was practiced in Egypt as early as A.D. 410. The literature reports the distilling of mint oil for an eyewash in Japan as early as A.D. 984. Production began in England about 1696, and in the United States, at Ashfield, Mass., in 1812. Production extended to Michigan in 1835, to Indiana in about 1855, and to the Pacific Coast States around the early 1900's. The yield of oil from mints varies greatly with season, cultural conditions, and geographic location. Both peppermint and spearmint production is currently concentrated primarily in 6 states: Washington, Oregon, Idaho, Wisconsin, Indiana and Michigan. The mint oils produced in each of these regions are often similar in composition, but possess very distinct odor and taste characteristics, caused by regional variances in temperature, photoperiod, and light intensity.

In current times the mint plant, both spearmint and peppermint, are grown in large acreage's, primarily in the aforementioned areas in the United States, as well as other parts of the world, some for garnish purposes, but mostly for the oil that is recovered. The resulting oil is used to provide fragrance and flavor for various products. The mint oil is used because of its ability to mask undesirable flavors and odors, as well as to further enhance products such as gum, tooth paste, perfumes, and the like.

The physical means most often used to obtain the essential oil of a plant include extraction, vacuum distillation, steam distillation, and supercritical gas and solvent extraction. The most widely used method is steam distillation, which greatly takes advantage of the volatility associated with a vast number of essential oils.

Once a crude essential oil is obtained, it is often further processed. This is usually done through classic vacuum and steam distillation procedures to concentrate the oil.

Mint essential oils are primarily obtained by steam distillation of the fresh above ground parts of a mature mint plant. American peppermint oil is obtained from *Mentha piperita L. Mentha spicata L.* produces spearmint oil, native type and *Mentha gentiles L.*, Cardiaca ger. produces spearmint oil, Scotch type. All of these oils are typically obtained in crude form by doing a large steam distillation of the plants after they have been cut and allowed to dry for several days.

Yields are reduced greatly if the plants are too thick in the field. Thick stands prevent full leaf development and cause lower leaves to fall off, owing to the continued dampness and shading. Rough handling when the herb is too dry also causes loss through shattering of leaves, as most of the oil is recovered from the leaves.

The cost of production and distillation of spearmint and peppermint is very expensive; therefore, it is imperative that the maximum oil possible be recovered from every producing plant if the maximum monetary potential is to be achieved.

The process of removing oil from mint consists of passing steam through the cut hay, thus vaporizing the oil. The steam and oil vapors are then conducted through a condenser, and are reduced to water and oil. As they are collected in receiving vessels, the water and oil separate into layers, with the oil floating on the surface. Although distilling equipment has gradually improved, the method for removing oil from the plant has changed very little.

There is still a need for methods to improve the yield of mint oil extracted and to improve the economy and value of mint oil extraction methods.

SUMMARY OF THE INVENTION

The present invention is directed to a method for extracting mint oil from mint plants, the method comprising applying a surfactant on the plant material and subjecting the plant material to steam distillation.

Additional advantages and novel features of the invention will be set forth in part in the description that follows, and in part will become apparent to those skilled in the art upon examination of the following or may be learned by practice of the invention. The advantages of the invention may be realized and attained by means of the instrumentalities and combinations particularly pointed out in the appended claims.

DETAILED DESCRIPTION

The present invention is, in general terms, a process to improve the yield of oil extracted by steam distillation from mint plants. This new process or method applies a surface active agent, also referred to as a surfactant, on to the mint plant before the steam distillation extraction of the mint oil.

Referring to the figures, an exemplary embodiment of the present invention is described herein. The use of the invention, as described in this illustrative embodiment, includes the steps and structures necessary for understanding and explaining the invention and its use. Other typical steps and structures that are normally related to the use of the invention and well known to one skilled in the art, but that are not essential to the understanding of the present invention, are not described in detail herein, to avoid confusion.

Figure 1:
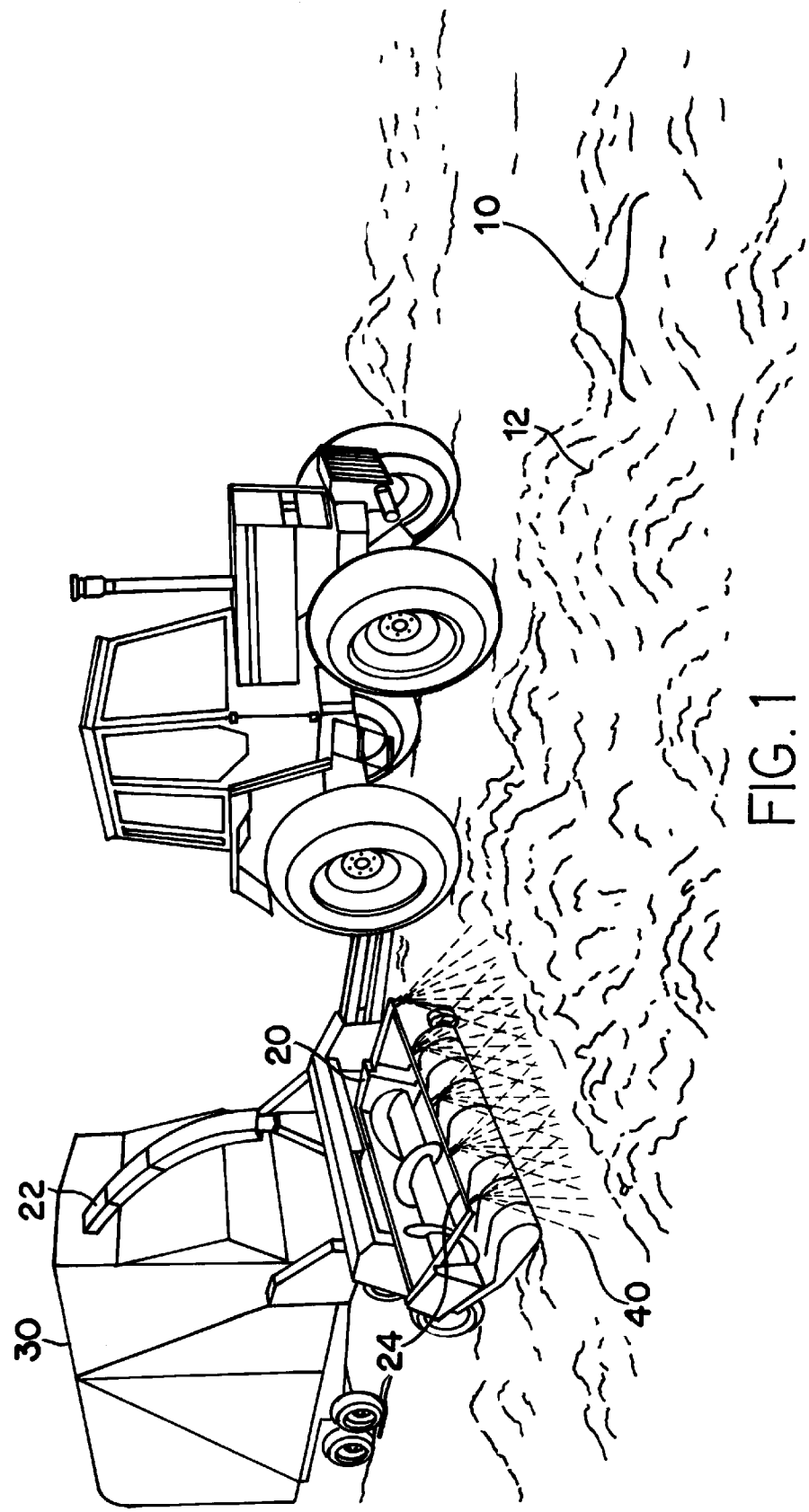
FIG. 1 shows mint plants cut in a windrow, with surfactant being applied to the windrow, wherein the windrow is being picked up by a chopper with a blower spout and delivered into a mint tub, as described in an exemplary embodiment of the present invention.
Figure 2:
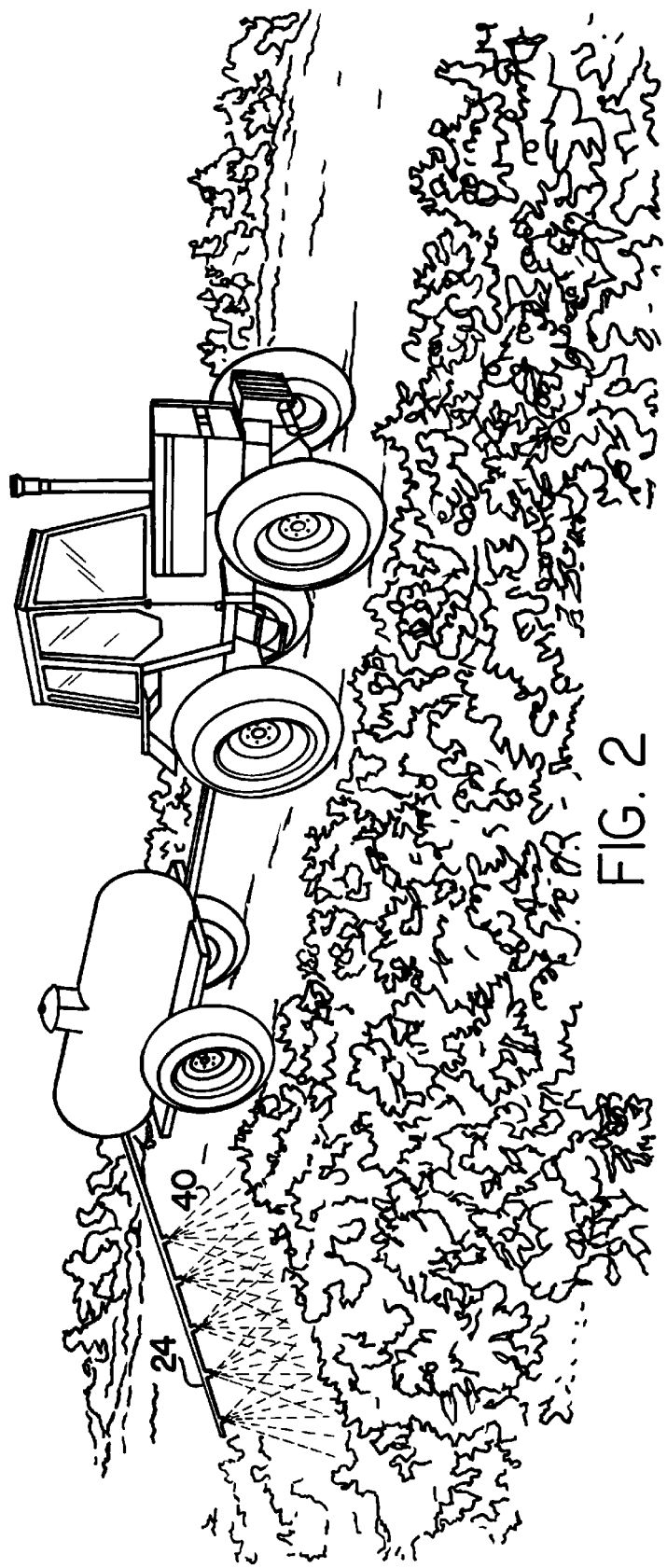
FIG. 2 shows an alternative application of surfactant that is suitable for use with the present invention.
Figure 3:
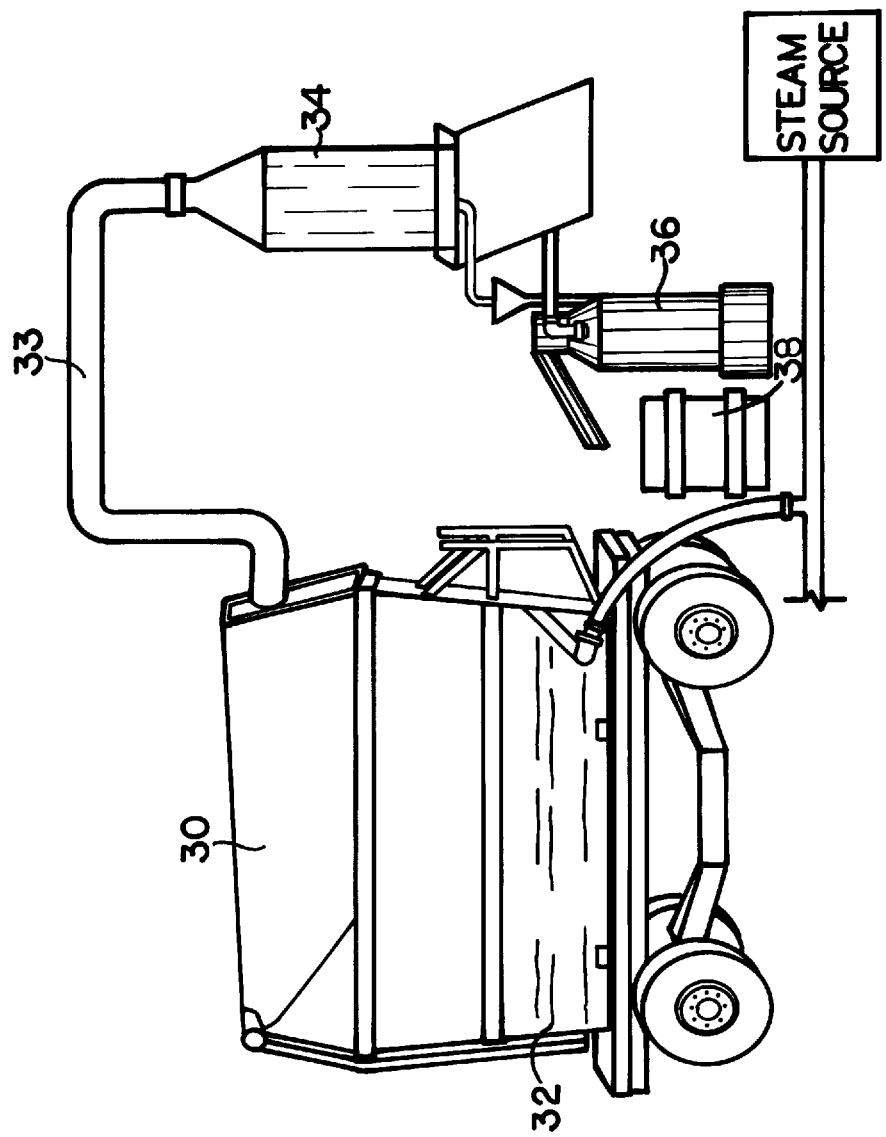
FIG. 3 shows a mint distillery, suitable for use with the present invention.

The typical mint harvest begins when the mint plant reaches a certain maturity, which is ideally when the plant contains the most oil, and has desired qualities. When the majority of the plants reach this stage, the plants are cut or mowed. Typically the mint is cut or harvested using a machine called a windrower. Small plots may be cut by hand, but this is not a common practice in the U.S. The windrower cuts the mint plants or hay at ground level, delivering both sides of the cut hay to the center, forming an even, continuous layer of hay, shown here as windrow 10, in FIG. 1. The mint hay 12 is allowed to air dry in windrow 10 for a period of time to reach a desirable moisture content for distillation. Typically to prepare hay 12 for chopping, hay 12 would be cured in windrow 10 to a moisture content, of approximately 40%. When hay 12 is dried to the desired moisture content windrow 10 is then chopped with a power driven chopper 20. Chopper 20 is designed to pick up windrow 10, cut or chop mint hay 12 to a desired length, typically about 2 inches, and deliver mint hay 12 to mint tub 30. The delivery is accomplished as chopped mint hay 12 is blown through blower spout 22, attached to chopper 20 into enclosed vat or mint tub 30.

In accordance with this invention, a surfactant 40 is applied to the mint plant material before the oil is extracted by steam distillation. In the described, exemplary embodiment, surfactant 40 is applied to mint hay 12 during the chopping and blowing, or just before windrow 10 is processed by chopper 20. The application of surfactant 40 is desirably sprayed on windrow 10 before the windrow is picked up by chopper 20, and blown into enclosed tub 30. Application of surfactant 40 to hay 12 just before or simultaneous with hay 12 being picked up by chopper 20 for processing moistens the dry leaves on the top and edges of windrow 10, which helps to reduce the loss of dry leaves during the chopping process. The word surfactant is a well known abbreviation for the term "surface active agent." Surfactant is meant in the context of this invention to mean a substance that lowers the surface tension of a liquid. The most typical examples of a surfactant are detergents and soaps.

Most of the oil recovered is from the leaf. If hay 12 becomes too dry, the leaves on top are easily shattered and often blown off of windrow 10 as dust. Since the majority of the oil extracted comes from the leaf portion of the mint plant, shattered and lost leaf material represents an undesirable economic loss of mint oil. Therefore, the application of surfactant 40 to windrow 10 just before chopping and blowing into tub 30 is desirable to minimize loss of plant material in the form of blowing dust.

To effect the application of surfactant 40 on hay 12, a sprayer boom 24 can be mounted directly onto chopper 20, so surfactant 40 can be applied to windrow 10 as it is being picked up. An adequate amount of liquid surfactant 40 is approximately 30 gallons of liquid for application to approximately 800–1100 pounds of hay; but the amount of hay sprayed with the 30 gallons can range from 200 to 800 lb. Surfactant 40 was produced in this example by adding one cup of powdered detergent to the 30 gallons of water in the supply source, typically a supply tank, for sprayer boom 24. The amount of liquid surfactant 40 used would depend on the maturity of the plants and the size of windrow 10. The amount of surfactant 40 to be sprayed on windrow 10 will also vary, depending on the moisture content of the hay. A typical application of surfactant 40, using a commercial spray boom, would use 30 to 50 gallons applied to the amount of mint plant that would fill one tub or vat 30; this amount will increase the yield of oil extracted and in most cases control the loss of leaves in the form of dust. Additionally it is desirable for chopper 20 to be adjusted to insure that mint tub 30 is evenly filled from front to back.

Spraying surfactant 40 on windrow 10 of mint hay 12, just before windrow 10 is chopped will result in an increase of oil recovered when mint hay 12 is distilled, compared to the oil recovered from mint hay 12 that is not sprayed or sprayed with only water, as shown in Table 1. The amount of surfactant 40 to be added may vary depending on the size of tub 30 and selected method of application of surfactant 40. It is contemplated that surfactant 40 can be applied at any time before distillation of the mint oil. Examples of times in the harvesting of the mint plants when surfactant 40 may be applied include, but are not limited to, just before mowing the plants into windrow 10, at at separate time before the picking up of hay 12 by chopper 20, or after hay 12 has already been chopped and blown into tub 30. Examples of suitable methods of applying surfactant 40 to the mint plant, or hay 12, include, but are not limited to, hand spraying, using any type of sprinkler system, sprayer booms or sprayer trailers. It is also contemplated that under some conditions surfactant 40 might be applied to hay 12 more e before distillation.

TABLE 1

| Gross Tub Wt | Pounds oil recovered | No Surfactant | Surfactant |
|---|---|---|---|
| 31720 | 79.75 | X | |
| 31320 | 87.5 | | X |
| 31640 | 90.0 | X | |
| 31480 | 93.0 | | X |
| 31540 | 87.0 | X | |
| 31680 | 93.25 | | X |
| 31500 | 96.5 | X | |
| 31320 | 99.0 | | X |
| 28680 | 70.50 | | X |
| 27820 | 59.25 | X | |
| 29620 | 68.0 | | X |
| 28220 | 60.5 | X | |
| 29200 | 63.0 | | X |
| 29200 | 59.25 | X | |
| 30200 | 63.75 | | X |
| 29260 | 60.0 | X | |
| 30100 | 66.25 | | X |
| 29420 | 61.75 | X | |
| 30060 | 71.75 | | X |
| 29920 | 68.75 | X | |
| 30860 | 80.0 | | X |
| 31140 | 70.25 | X | |

Mint tub 30 is typically filled with hay 12 from the back of tub 30 to the front. Chopper 20 includes blower spout 22 that can be rotated back and forth. This enables tub 30 to be filled evenly from side to side, from the back working forward until tub 30 is totally filled in the typical fashion. The filled tub 30 is then detached from chopper 20 and is ready to be delivered to the mint distillery. An empty tub 30 is re-attached to chopper 20, ready to repeat the preceding described process.

The mint distillery, where tub 30 proceeds to, for steam distillation, has four major components. The cooking vessel, or tub 30, a steam source, typically a boiler, that produces steam, a condenser 34, that converts steam back to liquid, and a receiving or separating can 36 that accumulates the resulting distillate and separates the recovered mint oil from the distilled water.

The steam distillation is accomplished by introducing pressurized steam into tub 30. The steam is directed through numerous small openings in rows of pipes in the floor of tub 30. From the openings, the steam passes through chopped mint hay 12 and is collected at the top of tub 30. The steam is then routed through a return line to a condensation and separation apparatus. In this example the condensation apparatus is a condenser 34 and the separation apparatus is separating can 36. Steam and mint oil are condensed and collected from condenser 34 into a separating can 36.

Tub 30 usually has a small drop down door in the top front for chopper 20 to blow chopped mint hay 12 through, and a large back door, so the spent hay can be dumped. Both doors are equipped with gaskets and latches so when the doors are latched shut the tub becomes a pressurized vessel. Tub 30 has a manifold of several rows of pipes 32 in the bottom of tub 30, as described above. With the doors of tub 30 shut, the only two openings are (1) a cam-lock on the outside of tub 30, to the manifold of pipes 32 in the bottom of tub 30; and (2) on the top of the tub, to a vapor line 33, to be described elsewhere in this description. When the steam is metered into tub 30, the steam travels the full length of tub 30 through pipes 32 and exhausts through the numerous small openings which are evenly spaced on all sides of pipes 32 causing a layer of steam to be released in the bottom of tub 30. As the steam filters through chopped mint hay 12, the mint oil is vaporized and extracted from hay 12 with the steam and is carried to the top of tub 30, through an outlet, to a vapor line hose 33, which is connected to condenser 34, here a vertical condenser.

There are two types of condensers used in the mint industry, vertical and horizontal, to condense the steam carrying the mint oil gathered from the mint tub back to a liquid form. The decision of whether a horizontal or a vertical condenser is to be used depends on the user's choice, primarily determined by space, distillery design, and the temperature of the cooling water. The vertical condenser takes less floor space which lends to a more compact distillery. In cases where cooling water is very warm the horizontal condenser is often more desirable since it has considerably more cooling surface.

Mint oil is extracted more efficiently when temperatures are maintained at specific constant levels. The desired distillate temperature from condenser 34, for peppermint is approximately 110°, and for spearmint the temperature is approximately 90°, both at 2800 feet above sea level. To achieve these desired temperatures of the discharging distillate, cool water is introduced into the bottom of the cavity surrounding the pipes in condenser 34. The cooling water rises around the condenser pipes to the top of condenser 34, permitting the vapor to be condensed and converted into a liquid. The vapor flows from the top of tub 30, down through the pipes in condenser 34, that are submerged in the cooling water introduced into the bottom of condenser 34. The cooling water functions to maintain the desired temperature of the discharged distillate. The hot water from the top discharge outlet of condenser 34 can be used as a source of hot replacement water for the boiler.

From condenser 34 the distillate flows into separating can 36. Within separating can 36 the condensate separates into mint oil and water. Separating can 36 has a volume of water large enough to allow time for the mint oil to separate from the water. Because of relative density differences, the mint oil rises to the top and the water moves to the bottom of separating can 36. Since there is a continuous flow of distillate entering separating can 36, it is necessary for there to be an outlet for the water, minus the mint oil, to be continuously discharged. This is accomplished by continuously skimming or removing the mint oil from the top of the separating can and collecting the mint oil into storage containers, such as barrel 38. The waste water thus produced is either discarded, or in some cases, returned to the distillery system for reprocessing.

The term cooking refers to the steam being released into the tub. Adequate cooking time is needed to ensure all the oil has been extracted from mint hay 12. The oil can be measured as it accumulates in separating can 36. When the value of the oil being recovered is less than or equal to the cost of fuel for the boiler, labor, and equipment charges, typically the cooking process is stopped. Each tub 30 is typically processed by steam distillation for between 2 to 2½ hours. After the process is stopped, the steam distillation is discontinued, and tub 30 is disconnected from both the steam source and condenser 34. The spent hay 12 is dumped from tub 30, and tub 30 is returned to the field to repeat the process, as described above.

This process provides improved extraction and yield of mint oil from mint plants compared to the oil recovered from mint hay that is not sprayed or is sprayed only with water. A benefit of this method is that little or no equipment modification is necessary compared to the equipment that is typically employed in this industry.

The invention has been described in the environment of mowed mint hay collected in windrows. This environment was chosen for illustration purposes only, to further the understanding of the invention. It will be apparent to one skilled in the relevant art that the surfactant can also be applied to the plants prior to mowing or harvesting, or that the plants can be aggregated in configurations other than windrows upon or after the cutting the mint plants. It is also contemplated that surfactant 40 can be applied to the mint plants inside of tub 30 either before the start of the steam distillation or during steam distillation, in addition to application at the time of the plant harvest, as described above.

It will therefore be distinctly understood that the invention is not limited to the embodiment described herein. Modifications and variations are possible and may be practiced within other embodiments of the invention without departing from the scope of the invention as expressed in the following claims.

I claim:

1. A method for extracting essential oils from above ground portions of plant material, the method comprising:

applying a surfactant on the plant material and subjecting the plant material to steam distillation.

2. A method for extracting mint oil from mint plants, the method comprising:

applying a surfactant on the plant material and subjecting the plant material to steam distillation.

3. A method for extracting mint oil from mint plant, the method comprising:

mowing the mint plant;

applying surfactant to the mowed mint plant; and steam distilling the mowed mint plant.

* * * * *